(12) United States Patent
Park et al.

(10) Patent No.: US 11,429,777 B2
(45) Date of Patent: Aug. 30, 2022

(54) METHODS OF ESTIMATING WARPAGE OF INTERPOSERS AND METHODS OF MANUFACTURING SEMICONDUCTOR PACKAGE BY USING THE SAME

(71) Applicant: SAMSUNG ELECTRONICS CO., LTD., Suwon-si (KR)

(72) Inventors: Wonji Park, Suwon-si (KR); Jeonghoon Ahn, Seongnam-si (KR); Jihyung Kim, Seoul (KR); Jaehee Oh, Seongnam-si (KR); Yunki Choi, Yongin-si (KR); Minguk Kang, Busan (KR)

(73) Assignee: SAMSUNG ELECTRONICS CO., LTD.

( * ) Notice: Subject to any disclaimer, the term of this patent is extended or adjusted under 35 U.S.C. 154(b) by 0 days.

(21) Appl. No.: 17/213,538

(22) Filed: Mar. 26, 2021

(65) Prior Publication Data
US 2022/0035984 A1 Feb. 3, 2022

(30) Foreign Application Priority Data
Jul. 30, 2020 (KR) ........................ 10-2020-0095520

(51) Int. Cl.
*G06F 30/398* (2020.01)
*G06F 30/392* (2020.01)
*H01L 21/66* (2006.01)
*G06F 113/18* (2020.01)
(Continued)

(52) U.S. Cl.
CPC .......... *G06F 30/398* (2020.01); *G06F 30/392* (2020.01); *H01L 22/12* (2013.01); *G06F 2113/18* (2020.01); *G06F 2119/08* (2020.01); *G06F 2119/18* (2020.01); *H01L 2924/3511* (2013.01)

(58) Field of Classification Search
CPC ..................................... G06F 30/398
USPC ........................................... 716/111
See application file for complete search history.

(56) References Cited

U.S. PATENT DOCUMENTS 9,563,732 B1 2/2017 Call et al.
9,672,323 B2 6/2017 Hada et al.
9,812,405 B2 11/2017 Chen et al.
(Continued)

FOREIGN PATENT DOCUMENTS

KR 1020190133907 12/2019
WO 2010021287 A1 2/2010

*Primary Examiner* — Eric D Lee
(74) *Attorney, Agent, or Firm* — Myers Bigel, P.A.

(57) ABSTRACT

A method of estimating warpage of an interposer and a method of manufacturing a semiconductor package by using the same are disclosed. The interposer includes a through electrode passing through a substrate, and a plurality of metal wiring layers and a plurality of insulating layers on the substrate, and the method of estimating warpage of an interposer includes: performing a temperature sweep test by using sample interposers, and measuring warpages according to temperatures; deriving a warpage slope, as a function of temperature, of each of the sample interposers; deriving a warpage model by linearly fitting the warpage slope with respect to an average pattern density of metal wiring layers in each of the sample interposers; and calculating a room temperature warpage reference value of the interposer based on the warpage model.

20 Claims, 12 Drawing Sheets

(51) Int. Cl.
*G06F 119/08* (2020.01)
*G06F 119/18* (2020.01)

(56) References Cited

U.S. PATENT DOCUMENTS

| | | |
|---|---|---|
| 10,309,884 B2 * | 6/2019 | Ayotte ................ G01M 5/0075 |
| 10,756,075 B2 | 8/2020 | Hong et al. |
| 2007/0087529 A1 | 4/2007 | Chung et al. |
| 2013/0105063 A1 | 5/2013 | Dauksher et al. |

* cited by examiner

FIG. 5

|  | SAMPLE INTERPOSER ||||||| 
|---|---|---|---|---|---|---|---|
|  | SN1 | SN2 | SN3 | SN4 | SN5 | SN6 | SN7 |
| SG1 |  |  |  |  |  |  |  |
| SG2 |  |  |  |  |  |  |  |
|  |  |  |  |  |  |  |  |
|  |  |  |  |  |  |  |  |
| ⋮ |  |  |  |  |  |  |  |
| ⋮ |  |  |  |  |  |  |  |
|  |  |  |  |  |  |  |  |
|  |  |  |  |  |  |  |  |
| SG1 |  |  |  |  |  |  |  |
| SG2 |  |  |  |  |  |  |  |
| AVERAGE PATTERN DENSITY (PD) | PD1 | PD2 | PD3 | PD4 | PD5 | PD6 | PD7 |

METHODS OF ESTIMATING WARPAGE OF INTERPOSERS AND METHODS OF MANUFACTURING SEMICONDUCTOR PACKAGE BY USING THE SAME

CROSS-REFERENCE TO RELATED APPLICATION

This application is based on and claims priority under 35 U.S.C. § 119 to Korean Patent Application No. 10-2020-0095520, filed on Jul. 30, 2020, in the Korean Intellectual Property Office, the disclosure of which is incorporated by reference herein in its entirety.

BACKGROUND

The inventive concepts relate to methods of manufacturing a semiconductor package and, more particularly, to methods of manufacturing a semiconductor package by using a method of estimating warpage of an interposer.

Semiconductor packages having a structure in which a plurality of semiconductor chips are stacked have been widely used to improve the performance and storage capacity of a semiconductor device. Particularly, along with micro-pitches of a semiconductor chip, a wafer level packaging method of attaching a wafer having semiconductor elements onto an interposer and sawing the same has been proposed. However, generally, warpage of an interposer may occur due to stress by a wiring layer that is used for electrical connection to a semiconductor element, the wiring layer being formed on the interposer. Accordingly, a fault may occur in a subsequent process of attaching a wafer onto the interposer due to the warpage.

SUMMARY

The inventive concepts provide methods of manufacturing a semiconductor package by estimating a room temperature warpage of an interposer, thereby being capable of preventing and/or reducing faults from occurring in a process of attaching a wafer onto an interposer.

According to an aspect of the inventive concepts, there is provided a method of estimating warpage of an interposer, the interposer including a through electrode passing through a substrate, and a plurality of metal wiring layers and a plurality of insulating layers on the substrate, the method including: performing a temperature sweep test at a plurality of temperatures by using sample interposers, and measuring warpages of the sample interposers according to the plurality of temperatures; deriving a warpage slope, as a function of temperature, of each of the sample interposers; deriving a warpage model by linearly fitting the warpage slope with respect to an average pattern density of metal wiring layers in each of the sample interposers; and calculating a room temperature warpage reference value of the interposer based on the warpage model.

According to another aspect of the inventive concepts, there is provided a method of manufacturing a semiconductor package including an interposer including a through electrode passing through a substrate, and a plurality of metal wiring layers and a plurality of insulating layers on the substrate, the method including: deriving a warpage reference value by using sample interposers; and deriving an expected cumulative warpage of the interposer so that the interposer has an expected warpage that is greater than or equal to the warpage reference value, wherein the deriving of the warpage reference value includes: performing a temperature sweep test at a plurality of temperatures by using the sample interposers with different pattern densities of the metal wiring layers, and measuring warpages according to the plurality of temperatures; deriving a warpage slope, as a function of temperature, of each of the sample interposers; deriving a warpage model by linearly fitting the warpage slope with respect to an average pattern density of the metal wiring layers in each of the sample interposers; and calculating a room temperature warpage reference value of the interposer based on the warpage model.

According to another aspect of the inventive concepts, there is provided a method of manufacturing a semiconductor package including an interposer including a through electrode passing through a substrate, and a plurality of metal wiring layers and a plurality of insulating layers on the substrate, the method including: deriving a warpage reference value by using sample interposers; deriving an expected cumulative warpage of the interposer so that the interposer has the expected cumulative warpage that is greater than or equal to the warpage reference value; and manufacturing the interposer, wherein the deriving of the warpage reference value includes: performing a temperature sweep test at a plurality of temperatures by using the sample interposers with different pattern densities of the metal wiring layers, and measuring warpages according to the plurality of temperatures; deriving a warpage slope, as a function of temperature, of each of the sample interposers; deriving a warpage model by linearly fitting the warpage slope with respect to an average pattern density of the metal wiring layers in each of the sample interposers; and calculating a room temperature warpage reference value of the interposer based on the warpage model, wherein the deriving of the warpage model includes linearly fitting the warpage slope with respect to the average pattern density of the metal wiring layers according to an equation:

$$WS = a*PD + b$$

wherein WS is the warpage slope, PD is the average pattern density, a is a first constant, and b is a second constant.

BRIEF DESCRIPTION OF THE DRAWINGS

Embodiments of the inventive concepts will be more clearly understood from the following detailed description taken in conjunction with the accompanying drawings in which:

FIG. 5 is a table describing a method of calculating an average pattern density of the sample interposer of FIG. 4;

DETAILED DESCRIPTION

Hereinafter, embodiments of the inventive concepts will be described in detail with reference to the accompanying drawings.

Figure 1:
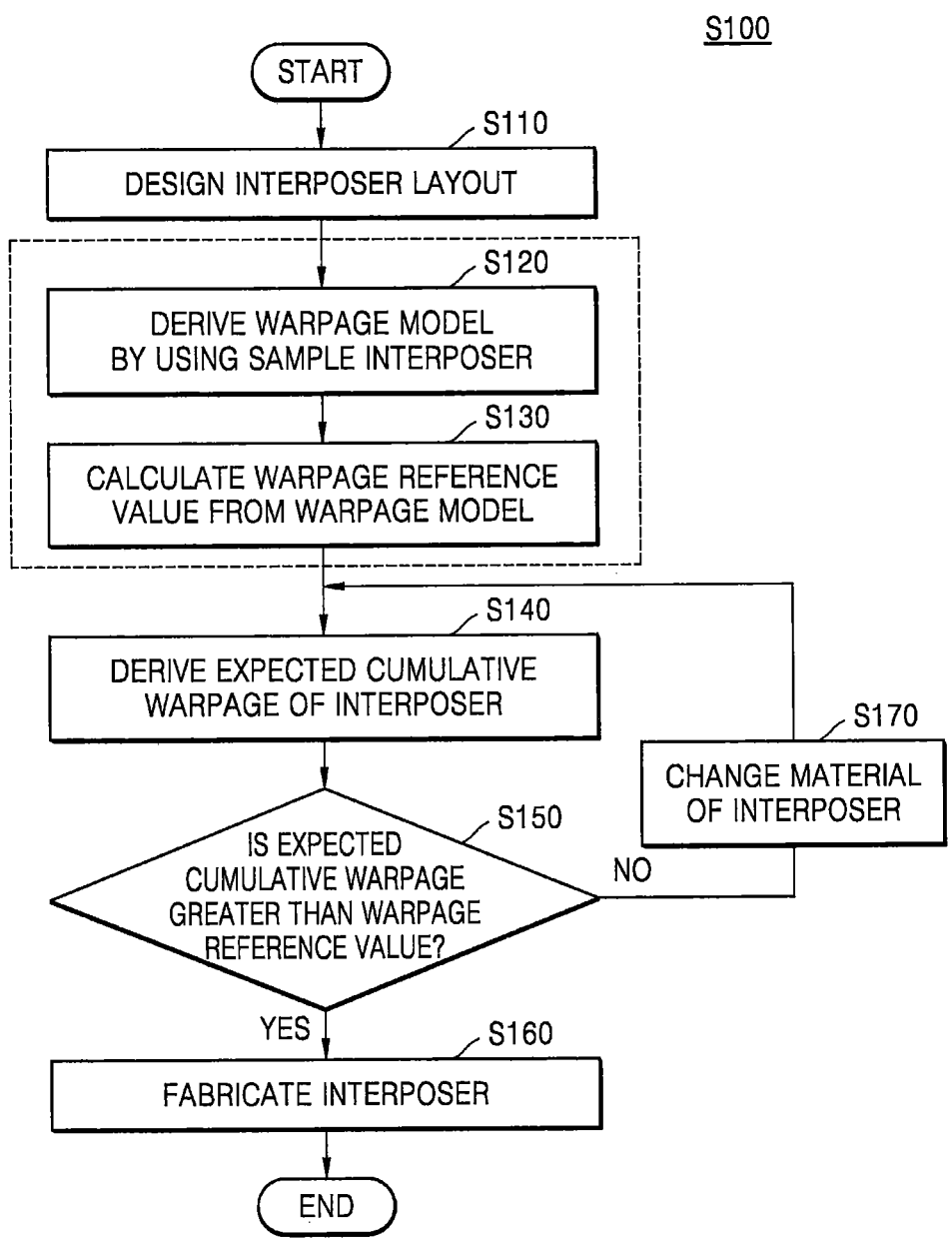
FIG. 1 is a flowchart of a method of fabricating an interposer, according to example embodiments of the inventive concepts.
Figure 2:
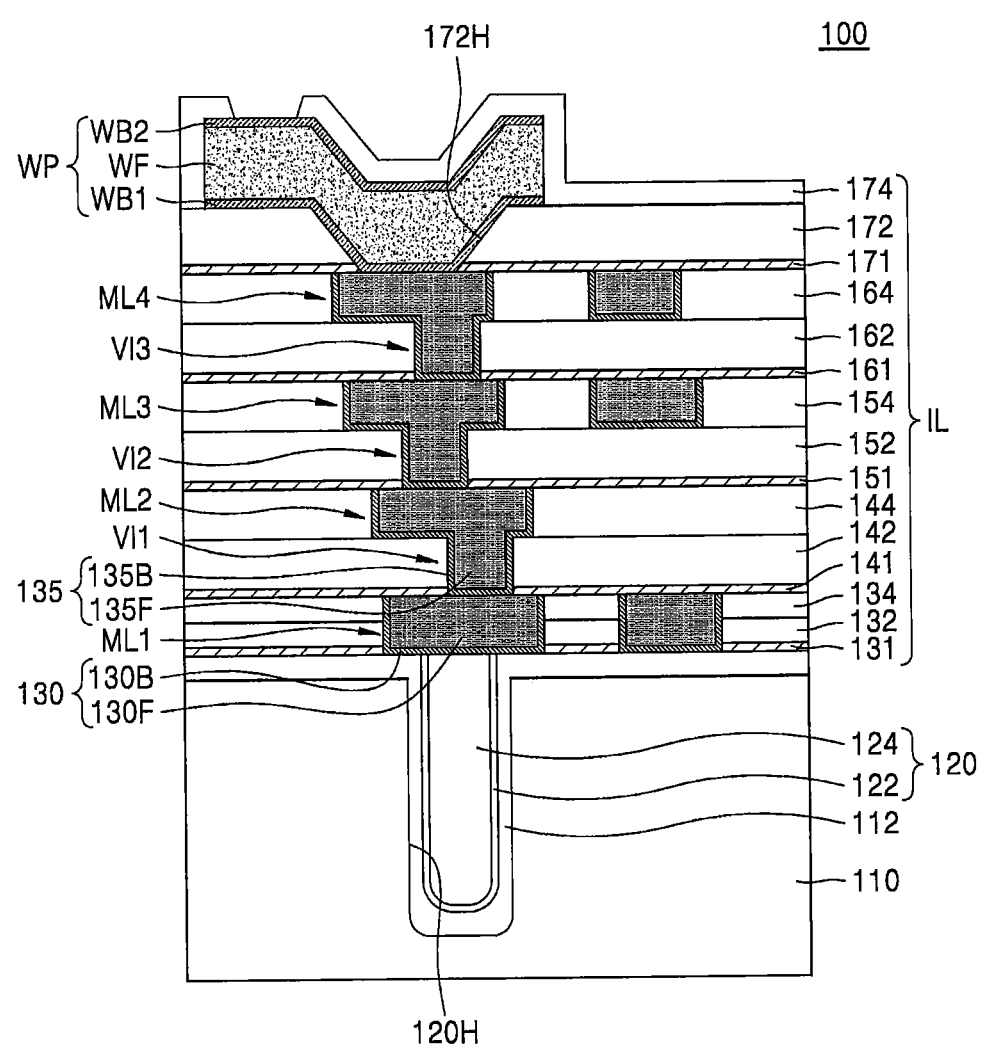
FIG. 2 is a cross-sectional view of a target interposer according to example embodiments of the inventive concepts.

FIG. 1 is a flowchart of a method S100 of fabricating an interposer, according to example embodiments of the inventive concepts. FIG. 2 is a cross-sectional view of a target interposer 100 according to example embodiments of the inventive concepts. Particularly, an interposer fabricating method associated with a method of estimating warpage of the target interposer 100 shown in FIG. 2 will be described with reference to FIG. 1.

Referring to FIGS. 1 and 2, in operation S110, a layout of the target interposer 100 may be designed.

The target interposer 100 may indicate an interposer to be used in a warpage estimating method. As shown in FIG. 2, the target interposer 100 may include a substrate 110, a through via structure 120 passing through the substrate 110, a plurality of metal wiring layers 130 arranged on an upper surface of the substrate 110 and electrically connected to the through via structure 120, a plurality of via layers 135 connecting between the plurality of metal wiring layers 130, an insulating layer structure IL encompassing the plurality of metal wiring layers 130 and the plurality of via layers 135, and a pad WP arranged on the insulating layer structure IL and electrically connected to the plurality of metal wiring layers 130.

For example, the through via structure 120 may be inside a through via hole 120H extending from the upper surface of the substrate 110 toward the inside of the substrate 110 and may include a barrier conductive layer 122 and a buried conductive layer 124. A via insulating layer 112 may be between the through via structure 120 and the substrate 110. The via insulating layer 112 may extend on the upper surface of the substrate 110 as shown in FIG. 2 but is not limited thereto.

For example, the plurality of metal wiring layers 130 may include a first metal wiring layer ML1, a second metal wiring layer ML2, a third metal wiring layer ML3, and a fourth metal wiring layer ML4 sequentially arranged on the substrate 110. The plurality of via layers 135 may include a first via layer VI1, a second via layer VI2, and a third via layer VI3, wherein the first via layer VI1 connects the first metal wiring layer ML1 to the second metal wiring layer ML2, the second via layer VI2 connects the second metal wiring layer ML2 to the third metal wiring layer ML3, and the third via layer VI3 connects the third metal wiring layer ML3 to the fourth metal wiring layer ML4.

For example, the insulating layer structure IL may include first to ninth insulating layers 132, 134, 142, 144, 152, 154, 162, 164, and 172, first to fifth etching stop layers 131, 141, 151, 161, and 171, and a passivation layer 174.

For example, the first etching stop layer 130 may be on the substrate 110, and the first and second insulating layers 132 and 134 may be on the first etching stop layer 131 so as to be on a side wall of the first metal wiring layer ML1. The second etching stop layer 141 may be on and/or cover upper surfaces of the second insulating layer 134 and the first metal wiring layer ML1, the third insulating layer 142 may be on a side wall of the first via layer VI1 on the second etching stop layer 141, and the fourth insulating layer 144 may be on a side wall of the second metal wiring layer ML2 on the third insulating layer 142. The third etching stop layer 151 may be on and/or cover upper surfaces of the fourth insulating layer 144 and the second metal wiring layer ML2, the fifth insulating layer 152 may be on a side wall of the second via layer VI2 on the third etching stop layer 151, and the sixth insulating layer 154 may be on a side wall of the third metal wiring layer ML3 on the fifth insulating layer 152. The fourth etching stop layer 161 may be on and/or cover upper surfaces of the sixth insulating layer 154 and the third metal wiring layer ML3, the seventh insulating layer 162 may be on a side wall of the third via layer VI3 on the fourth etching stop layer 161, and the eighth insulating layer 164 may be on a side wall of the fourth metal wiring layer ML4 on the seventh insulating layer 162. The fifth etching stop layer 171 may be on and/or cover upper surfaces of the eighth insulating layer 164 and the fourth metal wiring layer ML4, and the ninth insulating layer 172 may be on the fifth etching stop layer 171.

The ninth insulating layer 172 may include an opening part 172H, and the pad WP may be inside the opening part 172H so as to be connected to the fourth metal wiring layer ML4. The pad WP may include a lower barrier layer WB1, a pad metal layer WF, and an upper barrier layer WB2, and the passivation layer 174 may be on and/or cover a part of the pad WP and the ninth insulating layer 172.

According to example embodiments of the inventive concepts, the first to ninth insulating layers 132, 134, 142, 144, 152, 154, 162, 164, and 172 may be formed using at least one of silicon oxide, silicon nitride, and/or silicon oxycarbide (SiOC). As used herein, the term "and/or" includes any and all combinations of one or more of the associated listed items. Expressions such as "at least one of," when preceding a list of elements, modify the entire list of elements and do not modify the individual elements of the list. For example, the first to ninth insulating layers 132, 134, 142, 144, 152, 154, 162, 164, and 172 may include at least one of tetraethyl orthosilicate (TEOS), Tonen SilaZene (TOSZ), atomic layer deposition (ALD) oxide, flowable chemical vapor deposition (FCVD) oxide, high density plasma (HDP) oxide, and/or plasma enhanced oxidation (PEOX) oxide but are not limited thereto. According to some embodiments of the inventive concepts, at least one of the first to ninth insulating layers 132, 134, 142, 144, 152, 154, 162, 164, and 172 may include an insulating material, which applies compressive stress to the insulating layer structure IL. In some embodiments, the insulating material, which applies compressive stress, may include, for example, high compressive TEOS but is not limited thereto.

Although FIG. 2 shows an example in which the plurality of metal wiring layers 130 include the first to fourth metal wiring layers ML1, ML2, ML3, and ML4 arranged on different vertical levels, according to other embodiments of the inventive concepts, the plurality of metal wiring layers 130 may include three or less metal wiring layers or include five or more metal wiring layers. In addition, the numbers of material layers constituting the insulating layer structure IL may vary. For example, although FIG. 2 shows that each of the first to fifth etching stop layers 131, 141, 151, 161, and 171 is a single layer, according to other embodiments of the inventive concepts, at least one of the first to fifth etching stop layers 131, 141, 151, 161, and 171 may include two insulating layers formed of different materials. In addition, although FIG. 2 shows that each of the lower barrier layer WB1 and the upper barrier layer WB2 is a single layer, according to other embodiments of the inventive concepts, at least one of the lower barrier layer WB1 and the upper barrier layer WB2 may include two metal layers formed of different materials.

In addition, although not shown in FIG. 2, a capacitor structure (not shown) including a stack structure of a metal layer, an insulating layer, and a metal layer may be further on the same level as the third via layer VI3 or the fourth metal wiring layer ML4.

Referring back to FIG. 1, in the operation of designing the layout of the target interposer 100, the first to fourth metal wiring layers ML1 to ML4 may have first to fourth pattern densities PDM1 to PDM4, respectively, and the first to third via layers VI1 to VI3 may have first to third via pattern densities PDV1 to PDV3, respectively. The first to fourth pattern densities PDM1 to PDM4 of the first to fourth metal wiring layers ML1 to ML4 may be determined depending on a type and a design of a semiconductor element to be stacked on the target interposer 100 in a subsequent process.

For example, the first pattern density PDM1 of the first metal wiring layer ML1 may be defined by a ratio of an area of the first metal wiring layer ML1 to a sum of the area of the first metal wiring layer ML1 and an area of the second insulating layer 134 on the first metal wiring layer ML1. In some embodiments, the first pattern density PDM1 of the first metal wiring layer ML1 may be defined by a ratio of the area of the first metal wiring layer ML1 to a sum of the area of the first metal wiring layer ML1 and an area of the first insulating layer 132 on the first metal wiring layer ML1. In addition, the second pattern density PDM2 of the second metal wiring layer ML2 may be defined by a ratio of an area of the second metal wiring layer ML2 to a sum of the area of the second metal wiring layer ML2 and an area of the fourth insulating layer 144 on the second metal wiring layer ML2, the third pattern density PDM3 of the third metal wiring layer ML3 may be defined by a ratio of an area of the third metal wiring layer ML3 to a sum of the area of the third metal wiring layer ML3 and an area of the sixth insulating layer 154 on the third metal wiring layer ML3, and the fourth pattern density PDM4 of the fourth metal wiring layer ML4 may be defined by a ratio of an area of the fourth metal wiring layer ML4 to a sum of the area of the fourth metal wiring layer ML4 and an area of the eighth insulating layer 164 on the fourth metal wiring layer ML4.

Likewise, the first via pattern density PDV1 of the first via layer VI1 may be defined by a ratio of an area of the first via layer VI1 to a sum of the area of the first via layer VI1 and an area of the third insulating layer 142 on the first via layer VI1. The second via pattern density PDV2 of the second via layer VI2 may be defined by a ratio of an area of the second via layer VI2 to a sum of the area of the second via layer VI2 and an area of the fifth insulating layer 152 on the second via layer VI2, and the third via pattern density PDV3 of the third via layer VI3 may be defined by a ratio of an area of the third via layer VI3 to a sum of the area of the third via layer VI3 and an area of the seventh insulating layer 162 on the third via layer VI3.

In operation S120, a warpage model may be derived by using a sample interposer.

According to example embodiments of the inventive concepts, a sample interposer 100X (see FIG. 4) may have a similar structure to that of the target interposer 100 shown in FIG. 2 but may have a different average pattern density PD from that of the target interposer 100. For example, a sample interposer may include first to seventh sample models SN1 to SN7, wherein the first to seventh sample models SN1 to SN7 have first to seventh average pattern densities PD1 to PD7, respectively, and the first to seventh average pattern densities PD1 to PD7 may be different from each other.

Figure 4:
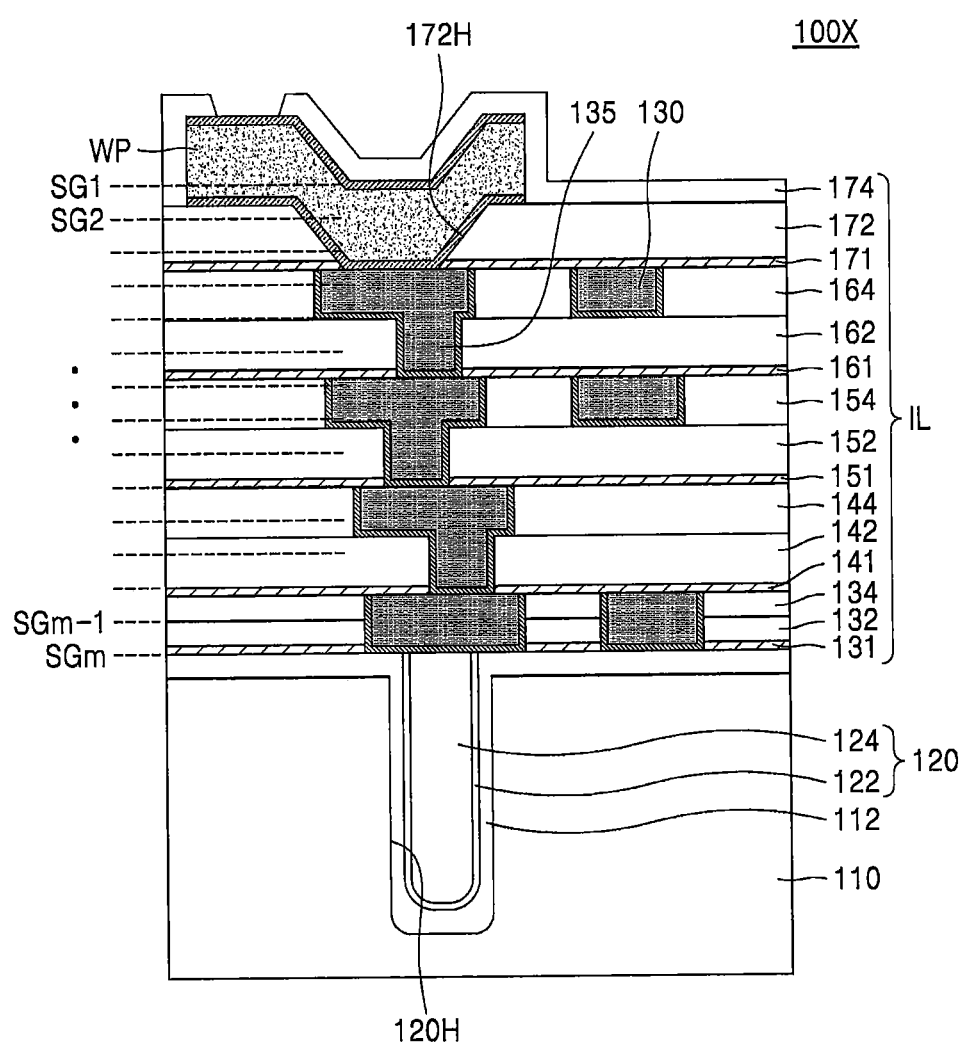
FIG. 4 is a cross-sectional view of a sample interposer used in the operations of FIG. 3.

According to example embodiments of the inventive concepts, as shown in FIG. 4, the average pattern density PD may be obtained by dividing the insulating layer structure IL into m segments SG1, SG2, . . . , SGm−1, and SGm in a direction orthogonal to the upper surface of the substrate 110, calculating pattern densities of the plurality of metal wiring layers 130, pattern densities of the plurality of via layers 135, or a pattern density of the pad WP in the respective segments SG1, SG2, . . . , SGm−1, and SGm, and obtaining an average value of the pattern densities in the m segments SG1, SG2, . . . , SGm−1, and SGm. For example, m may be in a range of approximately 10 to 100 but is not limited thereto. According to some embodiments of the inventive concepts, the sample interposer 100X may have the average pattern density PD of approximately 10 to 40%.

According to example embodiments of the inventive concepts, the warpage model may be obtained by plotting, as a function of an average pattern density, a warpage slope according to a temperature of the sample interposer 100X. For example, the warpage model may be obtained from a warpage slope according to Equation 1 below.

$$WS = a*PD + b \quad \text{[Equation 1]}$$

(where WS denotes a warpage slope, PD denotes an average pattern density, a denotes a constant, and b denotes a constant).

For example, the warpage model may be obtained by performing a temperature sweep on s sample interposers and linearly fitting a warpage slope from each temperature sweep result. According to some embodiments of the inventive concepts, s may be 5 to 50 but is not limited thereto. For example, FIGS. 3 to 8 show an example of calculating a warpage model of seven sample interposers (i.e., s=7). A method of deriving a warpage model will be described in detail below with reference to FIGS. 3 to 8.

In operation S130, a warpage reference value may be calculated from the warpage model.

According to example embodiments of the inventive concepts, the warpage reference value may be a warpage target value at room temperature in a state in which the target interposer 100 is fabricated. For example, the warpage reference value may be a warpage target value or minimum value at room temperature which the target interposer 100 has in a state in which the target interposer 100 is fabricated and completed (e.g., a fab-out state). For example, the warpage reference value may be a room temperature warpage target value calculated by considering a high temperature target warpage in a high temperature process (e.g., a semiconductor chip bonding process which may be performed at a temperature up to 125° C.).

In operation S140, an expected cumulative warpage of the target interposer 100 may be derived.

According to example embodiments of the inventive concepts, the expected cumulative warpage of the target interposer 100 may be obtained by calculating a total sum of warpage variants applied to the target interposer 100 in every unit processed in a process of fabricating the target interposer 100. For example, the expected cumulative warpage of the target interposer 100 as shown in FIG. 2 may be derived by measuring initial warpage of the substrate 110 and sequentially performing operations of adding a warpage variant in an nth unit step to (n−1)th step warpage to calculate nth step warpage, such as adding a warpage variant in a first unit step to the initial warpage to calculate first step warpage and adding a warpage variant in a second unit step to the first step warpage to calculate second step warpage. For example, the first unit step may be a process of forming the through via structure 120, the second unit step may be a process of forming the first etching stop layer 130, third and fourth unit steps may be processes of forming the first insulating layer 132 and the second insulating layer 134, respectively, and a fifth unit step may be a process of forming the first metal wiring layer ML1. As described above, a total number of unit steps may be determined by considering the number of metal wiring layers 130 and the number of material layers inside the insulating layer structure IL on different vertical levels of the target interposer 100.

According to example embodiments of the inventive concepts, in an operation of calculating the expected cumulative warpage of the target interposer 100, a warpage variant in each unit step may correspond to a changed value of warpage occurring on the target interposer 100 by a material layer formed in each unit step. For example, a warpage variant in the fifth unit step may correspond to a difference between warpage in a state in which the second insulating layer 134 is formed and warpage in a state in which the first metal wiring layer ML1 is formed, and the warpage variant in the fifth unit step may vary based on the first pattern density PDM1 of the first metal wiring layer ML1 The warpage variant in each unit step may vary according to a material constituting a material layer formed in each unit step, a pattern density of the material layer, a thickness of the material layer, and the like.

In operation S150, the expected cumulative warpage of the target interposer 100 may be compared with the warpage reference value.

When the expected cumulative warpage of the target interposer 100 is greater than the warpage reference value, the method of estimating warpage of the target interposer 100 may end, and the target interposer 100 may be fabricated in operation S160.

Herein, it may be defined that, when a vertical level at an edge part of the target interposer 100 is lower than a vertical level at a center point of the target interposer 100 (e.g., when the target interposer 100 is bent in a direction towards a bottom surface of the substrate 110), the warpage has a negative value, when the vertical level at the edge part of the target interposer 100 is the same as the vertical level at the center point of the target interposer 100, the warpage has a value of zero, and when the vertical level at the edge part of the target interposer 100 is higher than the vertical level at the center point of the target interposer 100 (e.g., when the target interposer 100 is bent in a direction towards the upper surface of the substrate 110 or the top surface of the insulating layer structure IL), the warpage has a positive value.

For example, when both the warpage reference value and the expected cumulative warpage have negative values, the expected cumulative warpage may have a negative value having a magnitude less than a magnitude (or absolute value) of the warpage reference value (e.g., the warpage reference value is −100 micrometers, and the expected cumulative warpage is −70 micrometers). The target interposer 100 may have a better warpage characteristic than the warpage reference value that is a minimum value required for a subsequent process, and in this case, an operation of fabricating the target interposer 100 may be performed.

Otherwise, when the expected cumulative warpage of the target interposer 100 is less than the warpage reference value, operation S170 of modifying the design of the target interposer 100 may be performed, and an expected cumulative warpage of the target interposer 100 according to the modified design may be derived again in operation S140.

For example, when both the warpage reference value and the expected cumulative warpage have negative values, the expected cumulative warpage may have a negative value having a magnitude greater than a magnitude (or absolute value) of the warpage reference value (e.g., the warpage reference value is −100 micrometers, and the expected cumulative warpage is −120 micrometers). The target interposer 100 may have a worse warpage characteristic than the warpage reference value that is a minimum value required for a subsequent process, and in this case, an operation of modifying the design of the target interposer 100 may be performed.

For example, the operation of modifying the design of the target interposer 100 may be performed by changing a material in at least one material layer included in the insulating layer structure IL. For example, the operation of modifying the design of the target interposer 100 may be performed by modifying at least one of the first to ninth insulating layers 132, 134, 142, 144, 152, 154, 162, 164, and 172 included in the insulating layer structure IL to an insulating material beneficial to apply compressive stress thereto. The insulating material beneficial to apply compressive stress thereto may include, for example, a high compressive TEOS material but is not limited thereto.

According to the example method described above, the warpage of the target interposer 100 may be accurately estimated based on the warpage model. In addition, when the expected cumulative warpage of the target interposer 100 is not better than the warpage reference value required for a subsequent process, the design of the target interposer 100 may be modified.

FIGS. 3 to 8 are views for describing operations of deriving a warpage model and a warpage reference value, according to example embodiments of the inventive concepts.

Figure 3:
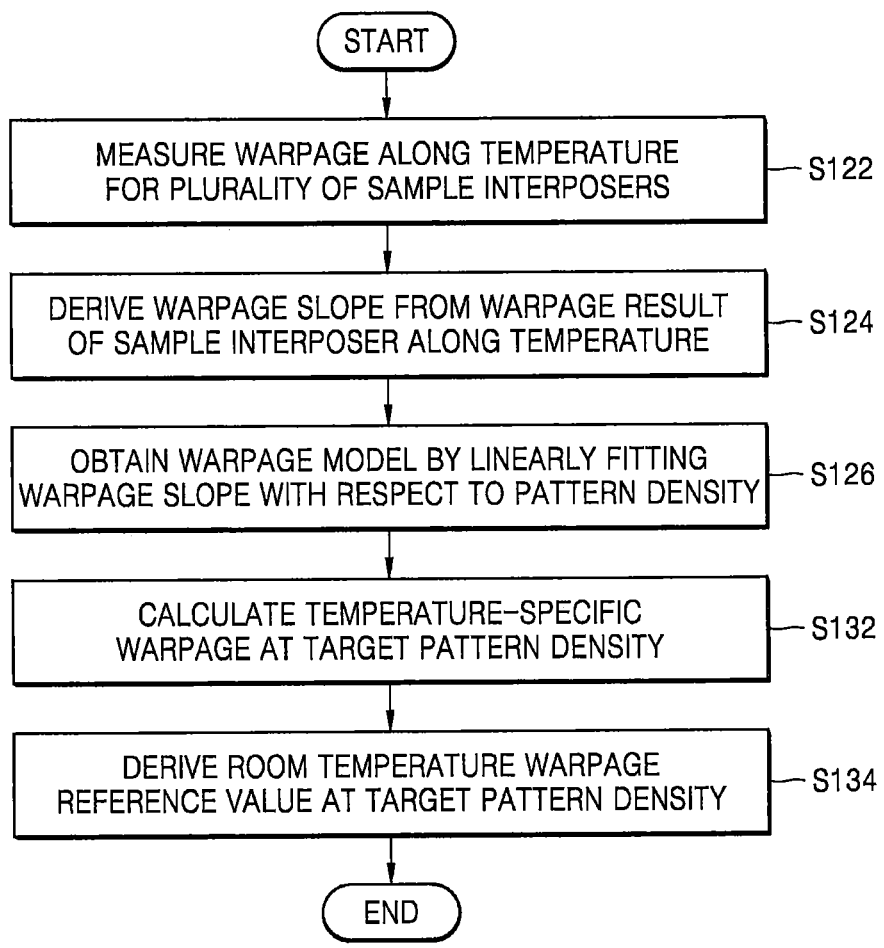
FIG. 3 is a flowchart of example operations of deriving a warpage model and a warpage reference value, according to example embodiments of the inventive concepts.
Figure 6:
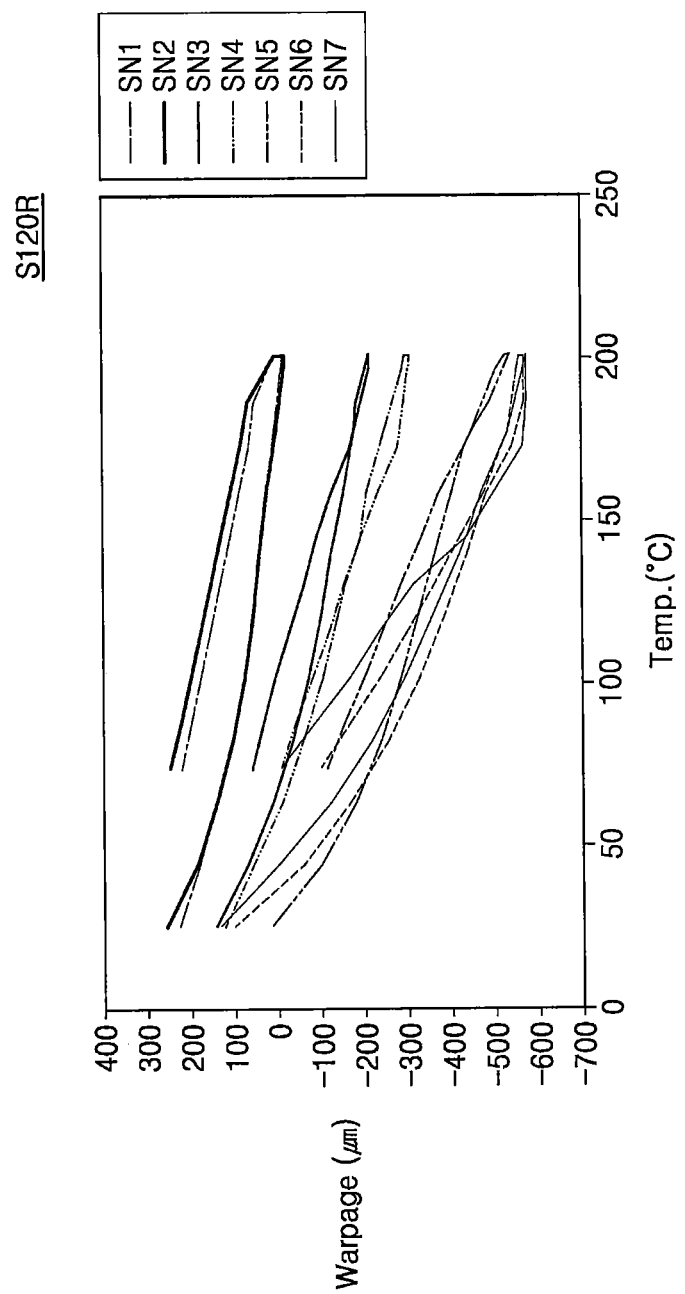
FIG. 6 is a graph showing a temperature sweep test result of the sample interposer, according to example embodiments of the inventive concepts.
Figure 7:
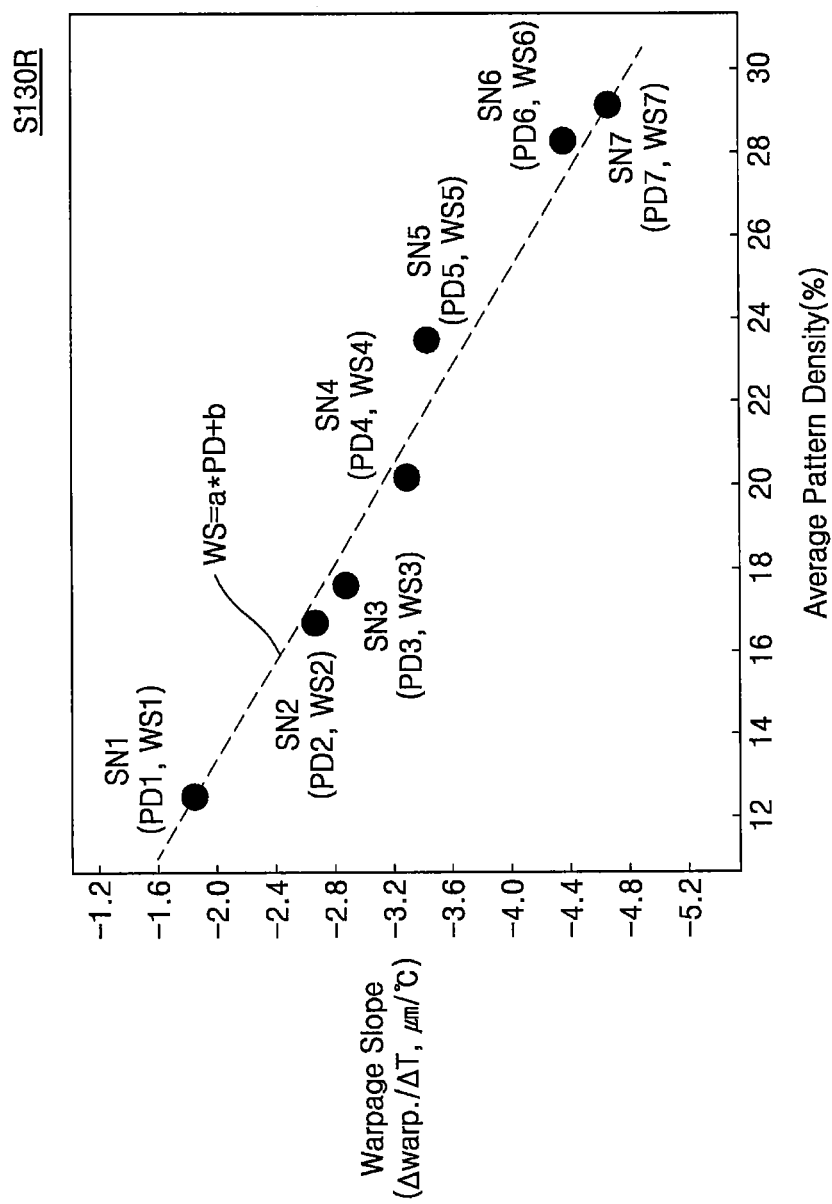
FIG. 7 is a graph showing a warpage model of the sample interposer, according to example embodiments of the inventive concepts.
Figure 8:
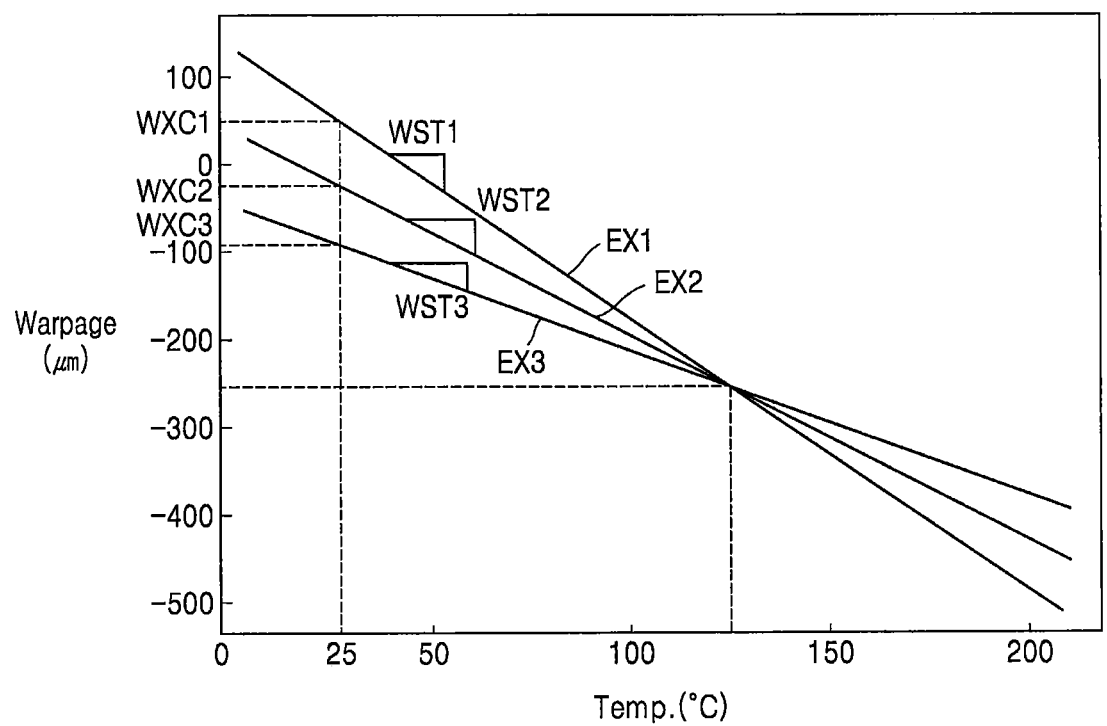
FIG. 8 is a graph showing a warpage profile of a target interposer, according to example embodiments of the inventive concepts.

Particularly, FIG. 3 is a flowchart of example operations of deriving a warpage model and a warpage reference value, according to example embodiments of the inventive concepts, and FIG. 4 is a cross-sectional view of the sample interposer 100X used in the operations of FIG. 3. FIG. 5 is a table for describing a method of calculating an average pattern density PD of the sample interposer 100X of FIG. 4. FIG. 6 is a graph showing a temperature sweep test result of the sample interposer 100X, and FIG. 7 is a graph showing a warpage model of the sample interposer 100X. FIG. 8 is a graph showing a warpage profile of the target interposer 100.

Referring to FIGS. 3 to 8, in operation S122, a warpage as a function of temperature may be measured for a plurality of sample interposers 100X.

For example, as shown in FIG. 4, the sample interposer 100X may include four metal wiring layers 130 and three via layers 135, and the insulating layer structure IL may have a structure encompassing and covering each of the four metal wiring layers 130 and the three via layers 135. For example, the sample interposer 100X may include s sample models having different average pattern densities PD. In an example shown in FIGS. 5 to 7, the sample interposer 100X may include first to seventh sample models SN1 to SN7, wherein the first to seventh sample models SN1 to SN7 may have first to seventh average pattern densities PD1 to PD7, and the first to seventh average pattern densities PD1 to PD7 may have different values.

As shown in FIG. 5, the average pattern density PD may be obtained by dividing the insulating layer structure IL into m segments SG1, SG2, . . . , SGm−1, and SGm in a direction orthogonal to the upper surface of the substrate 110, calculating pattern densities of the plurality of metal wiring layers 130, pattern densities of the plurality of via layers 135, and/or a pattern density of the pad WP in the respective segments SG1, SG2, . . . , SGm−1, and SGm, and obtaining an average value of the pattern densities in the m segments SG1, SG2, . . . , SGm−1, and SGm. For example, m may be in a range of approximately 10 to 100 but is not limited thereto.

According to some embodiments of the inventive concepts, the first to seventh sample models SN1 to SN7 may have the first to seventh average pattern densities PD1 to PD7 of approximately 10 to 40%, respectively.

According to example embodiments of the inventive concepts, a warpage profile of the sample interposer 100X as a function of temperature may be obtained by performing a temperature sweep test. As shown in FIG. 6, the temperature sweep test may be performed by gradually increasing a temperature of the sample interposer 100X from room temperature to a high temperature (e.g., from 25° C. to 200° C.) and then gradually decreasing the temperature of the sample interposer 100X back to room temperature. While performing the temperature sweep test, warpages of the sample interposer 100X at a plurality of temperature points may be measured, respectively. For example, a warpage value greater than zero (i.e., a positive value) may indicate that the sample interposer 100X is bent upward, and a warpage value less than zero (i.e., a negative value) may indicate that the sample interposer 100X is bent downward Referring back to FIG. 3, in operation S124, a warpage slope may be derived from a warpage result of the sample interposer 100X as a function of temperature.

According to example embodiments of the inventive concepts, the warpage slope may be obtained from a temperature sweep test graph S120R as shown in FIG. 6. According to some embodiments of the inventive concepts, the warpage slope may be defined as a first slope of the warpage in a first region in which a temperature increases from a low temperature to a high temperature. According to other embodiments of the inventive concepts, the warpage slope may be defined as an average value of the first slope of the warpage in the first region in which a temperature increases from the low temperature to the high temperature and a second slope of the warpage in a second region in which a temperature decreases from the high temperature back to the low temperature.

The first to seventh sample models SN1 to SN7 shown as an example in FIG. 6 may have first to seventh warpage slopes WS1 to WS7, respectively.

Referring back to FIG. 3, in operation S126, a warpage model S130R may be obtained by linearly fitting the warpage slope with respect to the average pattern density PD.

According to example embodiments of the inventive concepts, the warpage model S130R may be obtained by linearly fitting, as a function of the average pattern density PD, the warpage slope obtained from the temperature sweep test graph S120R as shown in FIG. 6. For example, the warpage model S130R may be obtained from a warpage slope according to Equation 1 below:

$$WS = a*PD + b \quad \text{[Equation 1]}$$

(where WS denotes a warpage slope, PD denotes an average pattern density, a denotes a constant, and b denotes a constant).

As shown in FIG. 7, the first to seventh sample models SN1 to SN7 may have first to seventh warpage slopes WS1 to WS7, respectively. When the first to seventh warpage slopes WS1 to WS7 with respect to the first to seventh average pattern densities PD1 to PD7 are drawn as a graph with the first to seventh average pattern densities PD1 to PD7 as an x-axis and the first to seventh warpage slopes WS1 to WS7 as a y-axis, a warpage slope may be fit as a linear function with respect to the average pattern density PD. According to example embodiments of the inventive concepts, in the linear fitting operation, a value of a determination coefficient $R^2$ of the sample interposer 100X may be 0.8 or more, and may be preferably 0.9 or more.

Referring back to FIG. 3, in operation S132, a temperature-specific warpage of a target interposer at a target pattern density may be calculated.

According to example embodiments of the inventive concepts, a temperature-specific warpage at the target pattern density of the target interposer 100 may be calculated from the warpage model S130R shown in FIG. 7. For example, first to third target models EX1, EX2, and EX3 of the target interposer 100 have first to third average pattern densities PDT1, PDT2, and PDT3, respectively. For example, the first average pattern density PDT1 of the first target model EX1 may be 22%, the second average pattern density PDT2 of the second target model EX2 may be 18%, and the third average pattern density PDT3 of the third target model EX3 may be 15%.

Target warpage slopes WST1, WST2, and WST3 of the first to third target models EX1, EX2, and EX3 may be calculated by Equation 1 above. A warpage profile S140R of the target interposer 100 may be obtained based on the target warpage slopes WST1, WST2, and WST3 obtained through Equation 1. The warpage profile S140R shown in FIG. 8 includes expected warpage values of the first to third target models EX1, EX2, and EX3 according to a temperature change The warpage profile S140R of the target interposer 100 may be obtained by Equation 2 below by using a target warpage slope:

$$WX = WST*T + c \quad \text{[Equation 2]}$$

(where WX denotes a warpage profile, T denotes a temperature, WST denotes a target warpage slope, and c denotes a constant).

A warpage profile may be determined by considering a process limit warpage value required in a subsequent high temperature process. For example, a warpage limit value at a high temperature may be considered based on a process of bonding a semiconductor chip on an interposer, or the like which may be performed at a temperature up to 125° C. In the example embodiment shown in FIG. 8, the warpage profile S140R is obtained by calculating a value of c so that the warpage profile S140R has a warpage value of −270 μm at 125° C. However, the value of c may be differently calculated according to requirements of a package bonding process, which are employed in a subsequent process, (e.g., having a warpage value of −150 μm at 125° C.). For example, a warpage limit value at the high temperature may be a random value within a range of −200 to −300 μm at a temperature of 100° C. to 130° C.

Referring back to FIG. 3, in operation S134, a room temperature warpage reference value of the target interposer at the target pattern density may be derived.

The warpage reference value may be a warpage limit value at room temperature in a state in which the target interposer 100 is fabricated. For example, the warpage reference value may be a warpage limit value at room temperature which the target interposer 100 has in a state in which the target interposer 100 is fabricated and completed (e.g., a fab-out state). For example, the warpage reference value may be a room temperature warpage limit value calculated by considering a high temperature warpage limit value in a subsequent high temperature process (e.g., a semiconductor chip bonding process which may be performed at a temperature up to 125° C.). For example, when the target interposer 100 has a room temperature warpage that is less than the warpage reference value, the target interposer 100 may have an increased possibility of faults occurring in a subsequent high temperature process (i.e., a process of bonding a semiconductor chip on the target interposer 100).

The warpage reference value may correspond to a warpage value at room temperature based on a warpage profile:

$$WXC = WS*25 + c \quad \text{[Equation 3]}$$

(where WXC denotes a warpage reference value, WS denotes a warpage slope, and c denotes a constant).

In the example embodiment shown in FIG. 8, the first to third target models EX1, EX2, and EX3 of the target interposer 100 have warpage reference values WXC1, WXC2, and WXC3 of 52 μm, −12 μm, and −90 μm, respectively.

According to the method described above, a temperature sweep test of the sample interposer 100X may be performed, and a warpage model and the room temperature warpage reference value may be derived through the temperature sweep test.

Figure 9:
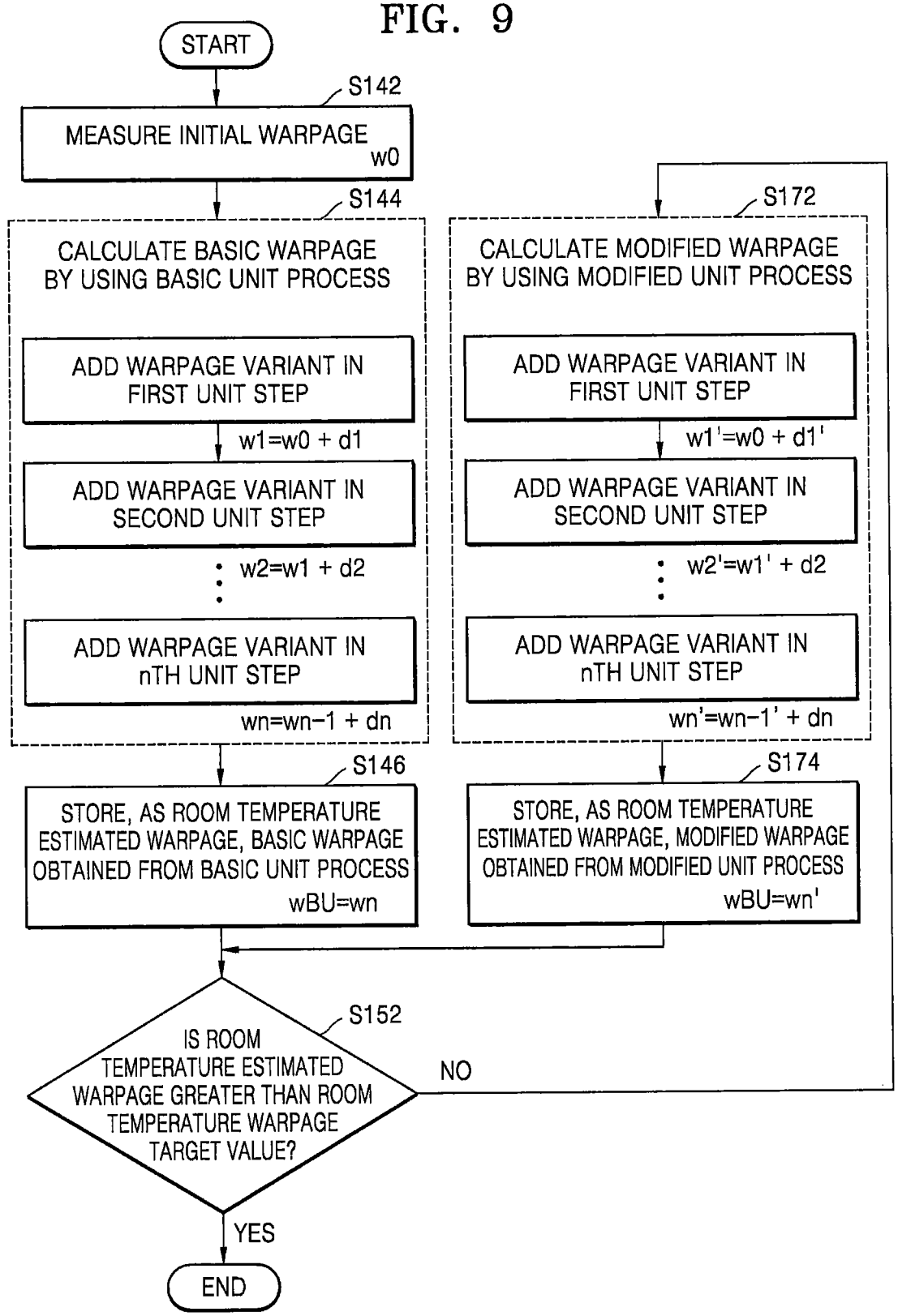
FIG. 9 is a flowchart of example operations of deriving an expected cumulative warpage, according to example embodiments of the inventive concepts.
Figure 10:
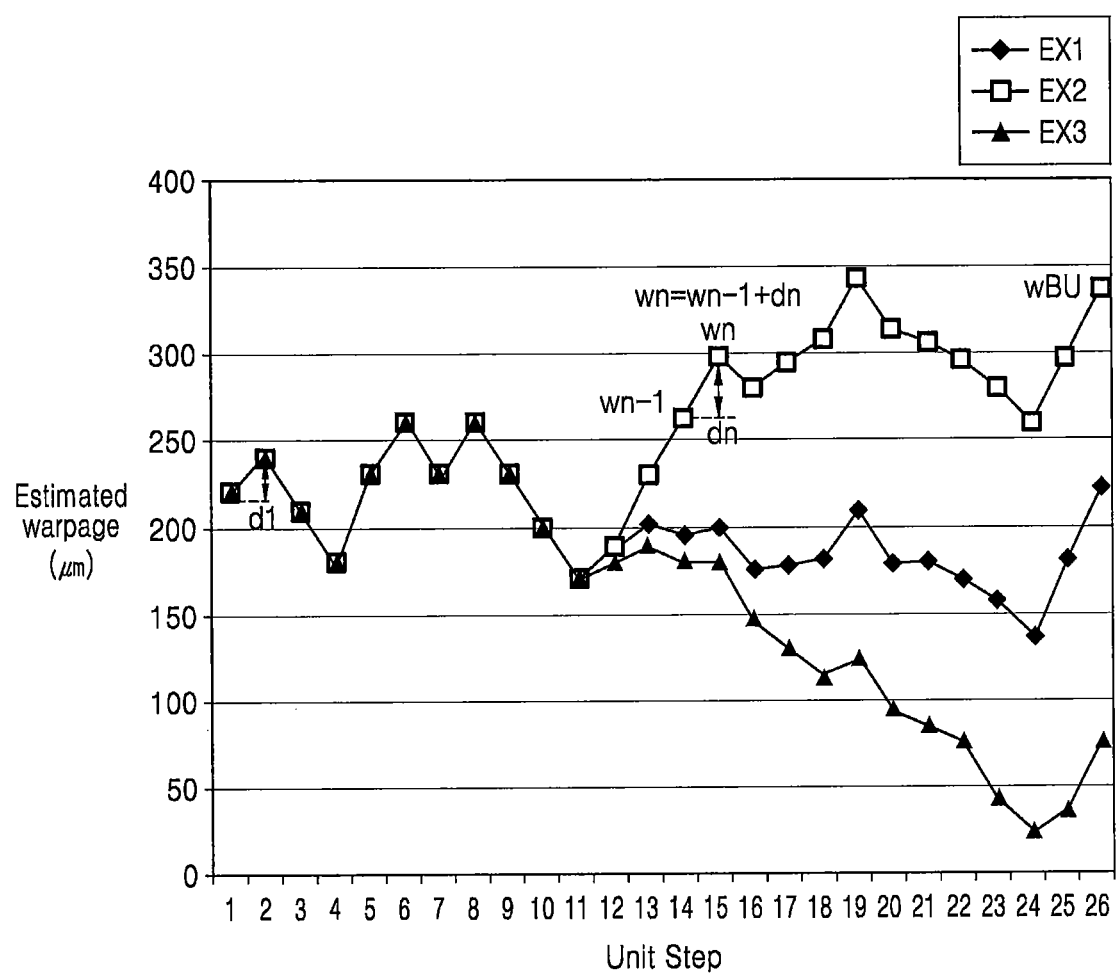
FIG. 10 is a graph showing a unit step-specific cumulative warpage calculated for each process operation by using the method of FIG. 9.

FIGS. 9 and 10 are views for describing an operation of simulating an expected cumulative warpage, according to example embodiments of the inventive concepts. Particularly, FIG. 9 is a flowchart of example operations of deriving an expected cumulative warpage, and FIG. 10 is a graph showing a unit step-specific cumulative warpage calculated for each process operation by using the method of FIG. 9.

Referring to FIG. 9, an expected cumulative warpage of the target interposer 100 may be obtained by calculating a total sum of warpage variants applied to the target interposer 100 in all unit processes in a process of fabricating the target interposer 100.

First, in operation S142, initial warpage w0 of the target interposer 100 may be measured.

In operation S144, an expected cumulative value of a basic warpage may be calculated by using a basic unit process.

To calculate the expected cumulative value of the basic warpage by using the basic unit process, first step warpage w1 is calculated by adding a warpage variant d1 in a first unit step to the initial warpage w0 (i.e., w1=w0+d1). Thereafter, second step warpage w2 is calculated by adding a warpage variant d2 in a second unit step to the first step warpage w1 (i.e., w2=w1+d2). Likewise, expected cumulative warpage may be derived by sequentially performing operations of calculating nth step warpage by adding a warpage variant in an nth unit step to (n−1)th step warpage (i.e., wn=wn−1+dn).

For example, for the target interposer 100 shown in FIG. 2, the first unit step may be a process of forming the through via structure 120, the second unit step may be a process of forming the first etching stop layer 130, third and fourth unit steps may be processes of forming the first insulating layer 132 and the second insulating layer 134, respectively, and a fifth unit step may be a process of forming the first metal wiring layer ML1. As described above, a total number of unit steps may be determined by considering the number of metal wiring layers 130 and the number of material layers inside the insulating layer structure IL on different vertical levels of the target interposer 100.

According to example embodiments of the inventive concepts, in an operation of calculating the expected cumulative warpage of the target interposer 100, a warpage variant in each unit step may correspond to a changed value of warpage occurring on the target interposer 100 by a material layer formed in each unit step. For example, a warpage variant in the fifth unit step may correspond to a difference between warpage in a state in which the second insulating layer 134 is formed and warpage in a state in which the first metal wiring layer ML1 is formed, and the warpage variant in the fifth unit step may vary based on the first pattern density PDM1 of the first metal wiring layer ML1 The warpage variant in each unit step may vary according to a material constituting a material layer formed in each unit step, a pattern density of the material layer, a thickness of the material layer, and the like.

FIG. 10 shows unit step-based cumulative warpages of the first to third target models EX1, EX2, and EX3 of the target interposer 100. The first to third target models EX1, EX2, and EX3 have the first to third average pattern densities PDT1, PDT2, and PDT3, respectively, and warpage variants in each unit step vary according to pattern densities of the first to third target models EX1, EX2, and EX3.

In operation S146, warpage in a final step (i.e., the nth step warpage wn), which is obtained from the basic unit process, may be stored as a room temperature expected warpage wBU.

In operation S152, the room temperature expected warpage wBU may be compared with a room temperature warpage target value wFT. The room temperature warpage target value wFT may correspond to the warpage reference value described with reference to FIGS. 3 to 8. When the room temperature expected warpage wBU is greater than the room temperature warpage target value wFT, a process of estimating warpage of the target interposer 100 may end, and thereafter, the target interposer 100 may be fabricated according to a layout design of the target interposer 100.

Otherwise, when the room temperature expected warpage wBU is less than or equal to the room temperature warpage target value wFT, a modified warpage may be calculated by using a modified unit process in operation S172.

For example, the modified unit process may be performed by changing a material in at least one material layer included in the insulating layer structure IL (see FIG. 2) to change a warpage variant in at least one unit step. For example, a warpage variant in at least one unit step may be changed by changing at least one of the first to ninth insulating layers 132, 134, 142, 144, 152, 154, 162, 164, and 172 included in the insulating layer structure IL to an insulating material beneficial to apply compressive stress thereto. The insulating material beneficial to apply compressive stress thereto may include, for example, a high compressive TEOS material but is not limited thereto.

For example, when a warpage variant in the first unit step is changed, first step warpage w1' is calculated by adding a warpage variant d1' in the first unit step to the initial warpage w0 (i.e., w1'=w0+d1'). Thereafter, second step warpage w2' is calculated by adding the warpage variant d2 in the second unit step to the first step warpage w1' (i.e., w2'=w1'+d2). Likewise, expected cumulative warpage may be derived by sequentially performing operations of calculating nth step warpage by adding a warpage variant in the nth unit step to (n−1)th step warpage (i.e., wn'=wn−1'+dn).

In operation S174, warpage in a final step (i.e., nth step warpage wn'), which is obtained in the modified unit process, may be stored as the room temperature expected warpage wBU.

In operation S152, the room temperature expected warpage wBU may be compared with the room temperature warpage target value wFT. When the room temperature expected warpage wBU is greater than the room temperature warpage target value wFT, a process of estimating warpage of the target interposer 100 may end, and thereafter, the target interposer 100 may be fabricated according to a layout design of the target interposer 100.

According to the method described above, a unit step-based expected cumulative warpage of the target interposer 100 may be derived and compared with the room temperature warpage reference value. When the expected cumulative warpage is less than or equal to the room temperature warpage reference value, the design of the target interposer 100 may be modified (e.g., changing a material of an insulating layer), and a process step-based modified expected cumulative warpage according to the modified design may be derived again. As described above, because an expected cumulative warpage of an interposer may be pre-estimated, an operation of manufacturing a sample lot of the target interposer 100 and performing a warpage test using the sample lot may be omitted, and accordingly, costs of a process of manufacturing a semiconductor package may be saved.

Figure 11A:
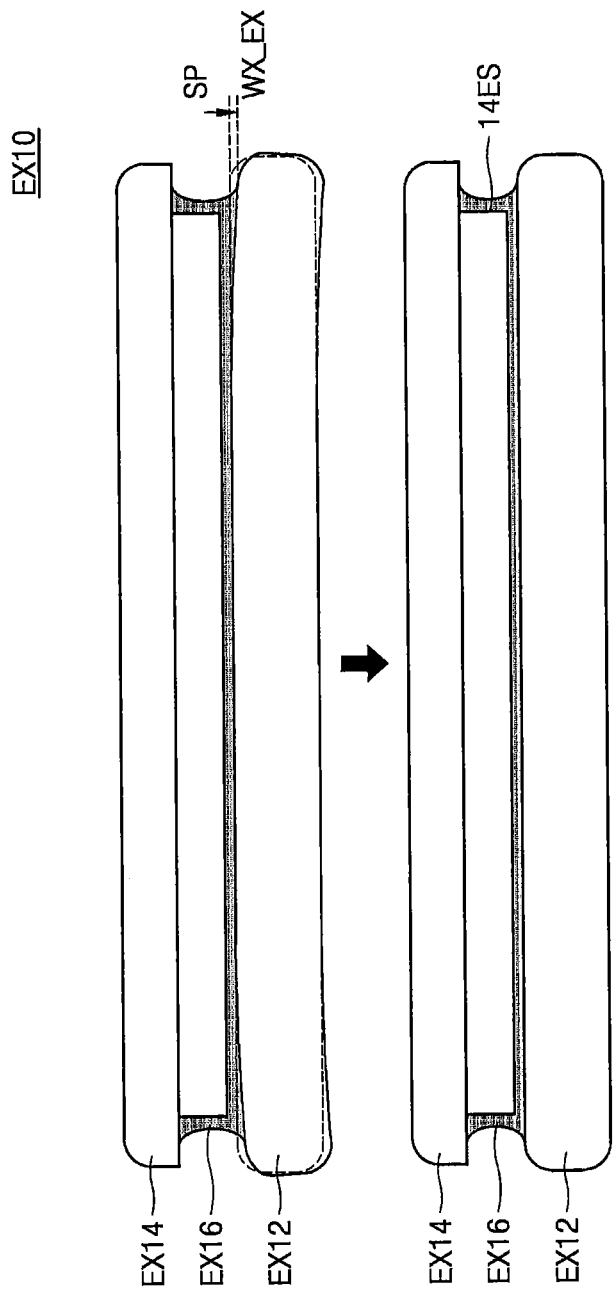
FIG. 11A is a cross-sectional view describing a process of manufacturing a semiconductor package, according to example embodiments of the inventive concepts.
Figure 11B:
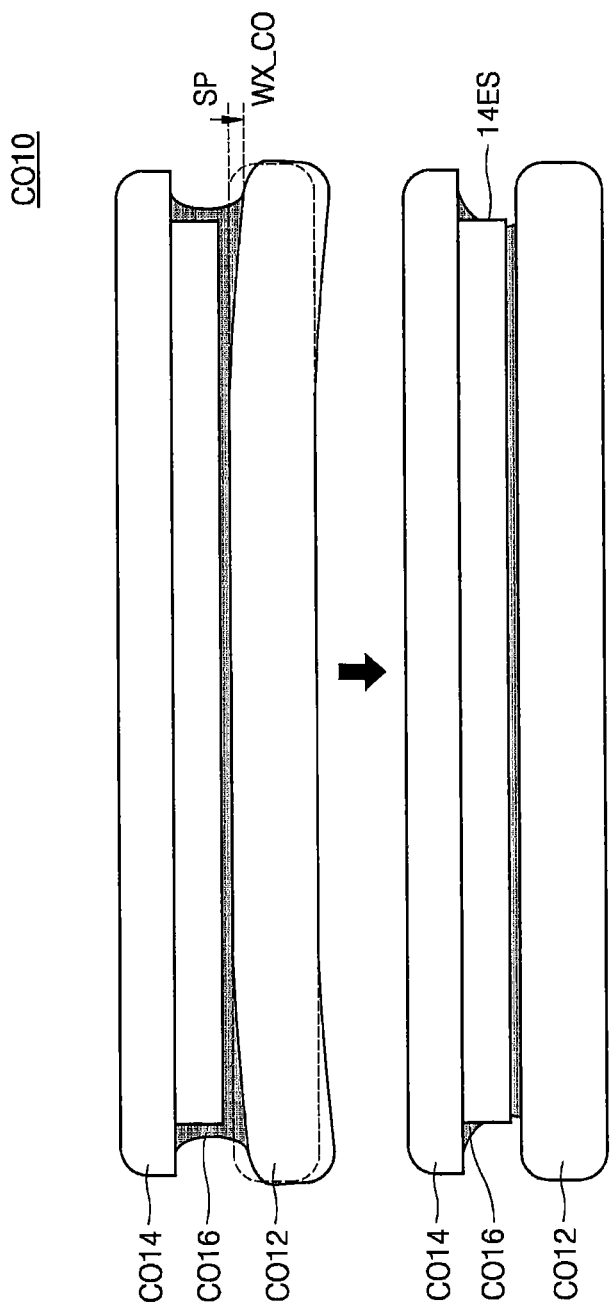
FIG. 11B is a cross-sectional view describing a process of manufacturing a semiconductor package, according to a comparative example.

FIG. 11A is a cross-sectional view for describing a process of manufacturing a semiconductor package EX10, according to example embodiments of the inventive concepts, and FIG. 11B is a cross-sectional view for describing a process of manufacturing a semiconductor package CO10, according to a comparative example.

Referring to FIG. 11A, a process of attaching a wafer EX14 onto an interposer EX12 by using an adhesive layer EX16 may be performed. According to example embodiments of the inventive concepts, the attachment process may be performed at a relatively high temperature, e.g., 100° C. to 130° C. The interposer EX12 may be the target interposer 100 described with reference to FIG. 2, for which the warpage estimating method described with reference to FIG. 1 is performed, and the wafer EX14 may be a semiconductor substrate on which a memory element, a logic element, an image sensor element, a micro-electromechanical system (MEMS) element, and the like have been formed.

The top of FIG. 11A shows that warpage occurs on the interposer EX12 in the process of attaching the wafer EX14 onto the interposer EX12, and the bottom of FIG. 11A shows a bonding structure of the interposer EX12 and the wafer EX14 in a state in which a high temperature adhering process is completed.

For example, the process of attaching the wafer EX14 onto the interposer EX12 by using the adhesive layer EX16 may be performed at a high temperature, and warpage may occur on the interposer EX12 at the high temperature so that the interposer EX12 is bent in a direction towards the bottom surface of the interposer EX12 (e.g., a direction away from the wafer EX14). As shown in the top of FIG. 11A, an edge part of the interposer EX12 may be lower than a reference level SP so that the interposer EX12 has first warpage WX_EX. The first warpage WX_EX may have a value greater than or equal to a warpage limit value at a high temperature (e.g., −270 μm at 125° C.). For example, the first warpage WX_EX may have a random value between −270 μm and 300 μm.

As shown in the bottom of FIG. 11A, after the high temperature attaching process is finished, a side wall 14ES of a device formed on the wafer EX14 may be sufficiently surrounded by the adhesive layer EX16, thereby preventing undesired damage such as chipping on the side wall 14ES in a subsequent grinding or sawing process.

FIG. 11A illustrates a wafer-level packaging scheme of attaching the wafer EX14 onto a front surface of the interposer EX12, but the inventive concepts are not limited thereto. For example, an already sawn plurality of semiconductor chips or a plurality of semiconductor chip stacking structures may be attached onto the interposer EX12.

Referring to FIG. 11B, a process of attaching a wafer CO14 onto an interposer CO12 according to comparative example by using an adhesive layer CO16 may be performed at a high temperature, and warpage may occur on the interposer CO12 at the high temperature. The interposer CO12 according to the comparative example may be an interposer for which the warpage estimating method described with reference to FIG. 1 is not performed.

As shown in the top of FIG. 11B, an edge part of the interposer CO12 may be lower than the reference level SP so that the interposer CO12 has a second warpage WX_CO. The second warpage WX_CO may have a value less than a warpage limit value at a high temperature (e.g., −270 μm at 125° C.). For example, the second warpage WX_CO may have a random value between −400 μm and −270 μm.

If the second warpage WX_CO has a value less than the warpage limit value at the high temperature, the adhesive layer CO16 may not be sufficiently filled between the interposer CO12 and the wafer CO14. As shown in the bottom of FIG. 11B, after the high temperature adhering process is finished, a side wall 14ES of a device formed on the wafer CO14 may not be sufficiently surrounded by the adhesive layer EX16, so that the side wall 14ES is exposed to the outside. Therefore, the exposed side wall 14ES of the wafer CO14 may be a vulnerable part at which undesired damage such as chipping occurs in a subsequent grinding or sawing process.

According to the aforementioned method of manufacturing a semiconductor package, a sample interposer may be used to perform temperature sweep, thereby obtaining a warpage slope and a warpage model and deriving a room temperature warpage reference value from the warpage model. Thereafter, an expected cumulative warpage of an interposer may be derived by summing process step-based warpage variants according to a basic design of an insulating layer and a metal wiring layer of the interposer. The expected cumulative warpage of the interposer may be compared with the room temperature warpage reference value, and when the expected cumulative warpage is less than the room temperature warpage reference value, a material of an insulating layer of the interposer may be changed, and a process step-based modified expected cumulative warpage according to a modified design may be derived. As described above, because an expected cumulative warpage of an interposer may be pre-estimated, a warpage test on a sample lot of the interposer may be omitted, and accordingly, costs of a process of manufacturing a semiconductor package may be saved.

While the inventive concepts have been particularly shown and described with reference to embodiments thereof, it will be understood that various changes in form and details may be made therein without departing from the scope of the following claims.

What is claimed is:

1. A method of estimating warpage of an interposer, the interposer comprising a through electrode passing through a substrate, and a plurality of metal wiring layers and a plurality of insulating layers on the substrate, the method comprising:
   performing a temperature sweep test at a plurality of temperatures by using sample interposers, and measuring warpages of the sample interposers according to the plurality of temperatures;
   deriving a warpage slope, as a function of temperature, of each of the sample interposers;
   deriving a warpage model by linearly fitting the warpage slope with respect to an average pattern density of the metal wiring layers in each of the sample interposers; and
   calculating a room temperature warpage reference value of the interposer based on the warpage model.

2. The method of claim 1, wherein the deriving of the warpage model comprises linearly fitting the warpage slope with respect to the average pattern density of the metal wiring layers according to a first equation:

$$WS = a*PD + b,$$

wherein WS is the warpage slope, PD is the average pattern density, a is a first constant, and b is a second constant.

3. The method of claim 2, wherein, in the linearly fitting of the warpage slope, a temperature sweep test is performed on a plurality of the sample interposers having different average pattern densities, and
   wherein a quantity of the plurality of the sample interposers is 5 to 50.

4. The method of claim 3, wherein, in the linearly fitting of the warpage slope, a value of a determination coefficient $R^2$ of the sample interposers is 0.8 or more.

5. The method of claim 2, wherein the deriving of the warpage model further comprises deriving the average pattern density of the metal wiring layers in each of the sample interposers, and
   wherein the deriving of the average pattern density of the metal wiring layers comprises dividing a bottom surface to a top surface of the plurality of insulating layers into m segments in a direction orthogonal to the substrate, calculating densities of the metal wiring layers in the respective segments, and deriving an average value of the densities calculated with respect to the m segments.

6. The method of claim 5, wherein the average pattern density of the metal wiring layers is approximately 5% to approximately 40%.

7. The method of claim 2, wherein the calculating of the room temperature warpage reference value comprises:
   obtaining a target warpage slope corresponding to an average pattern density of the interposer;
   obtaining a warpage profile of the interposer as a function of temperature by using the target warpage slope; and
   obtaining the room temperature warpage reference value using the warpage profile.

8. The method of claim 7, wherein the obtaining of the warpage profile as a function of the temperature is performed according to a second equation: $WX = WST*T + c$, wherein WX is the warpage profile, T is the temperature, WST is the target warpage slope, and c denotes a constant that is calculated by using a warpage limit value at a high temperature, and
   wherein the warpage limit value at the high temperature is within a range of −200 micrometers to −300 micrometers at a temperature of 100° C. to 130° C.

9. A method of manufacturing a semiconductor package comprising an interposer comprising a through electrode passing through a substrate, and a plurality of metal wiring layers and a plurality of insulating layers on the substrate, the method comprising:
   deriving a warpage reference value by using sample interposers; and
   deriving an expected cumulative warpage of the interposer so that the interposer has an expected warpage that is greater than or equal to the warpage reference value,
   wherein the deriving of the warpage reference value comprises:
   performing a temperature sweep test at a plurality of temperatures by using the sample interposers with different pattern densities of the metal wiring layers, and measuring warpages according to the plurality of temperatures;
   deriving a warpage slope, as a function of temperature, of each of the sample interposers;
   deriving a warpage model by linearly fitting the warpage slope with respect to an average pattern density of the metal wiring layers in each of the sample interposers; and
   calculating a room temperature warpage reference value of the interposer based on the warpage model.

10. The method of claim 9, wherein the deriving of the warpage model comprises linearly fitting the warpage slope with respect to the average pattern density of the metal wiring layers according to a first equation:

$$WS = a*PD + b,$$

wherein WS is the warpage slope, PD is the average pattern density, a denotes a first constant, and b denotes a second constant.

11. The method of claim 10, wherein, in the linearly fitting of the warpage slope, the temperature sweep test is performed on a plurality of the sample interposers having different average pattern densities, and
   wherein a quantity of the plurality of the sample interposers is 5 to 50.

12. The method of claim 10, wherein the deriving of the warpage model further comprises deriving the average pattern density of the metal wiring layers in each of the sample interposers, and
   wherein the deriving of the average pattern density of the metal wiring layers comprises dividing a bottom surface to a top surface of the plurality of insulating layers into m segments in a direction orthogonal to the substrate, calculating densities of the metal wiring layers in the respective segments, and deriving an average value of the densities calculated with respect to the m segments.

13. The method of claim 12, wherein the average pattern density of the metal wiring layers is approximately 5% to approximately 40%.

14. The method of claim 10, wherein the calculating of the room temperature warpage reference value comprises:
   obtaining a target warpage slope corresponding to an average pattern density of the interposer;

obtaining a warpage profile of the interposer as a function of temperature by using the target warpage slope; and obtaining the room temperature warpage reference value by using the warpage profile.

15. The method of claim 14, wherein the obtaining of the warpage profile as a function of the temperature is performed according to a second equation: WX=WST*T+c, wherein WX is the warpage profile, T is the temperature, WST is the target warpage slope, and c is a constant that is calculated by using a warpage limit value at a high temperature, and wherein the warpage limit value at the high temperature is within a range of −200 micrometers to −300 micrometers at a temperature of 100° C. to 130° C.

16. The method of claim 14, wherein the deriving of the expected cumulative warpage of the interposer comprises deriving the expected cumulative warpage by calculating a total sum of warpage variants applied to the interposer in all unit processes to form the plurality of metal wiring layers and the plurality of insulating layers.

17. The method of claim 16, wherein the deriving of the expected cumulative warpage further comprises:

dividing a process of fabricating the interposer into n unit steps;

measuring an initial warpage of the interposer;

calculating a first step warpage by adding a first warpage variant in a first unit step to the initial warpage;

calculating a second step warpage by adding a second warpage variant in a second unit step to the first step warpage;

calculating a kth step warpage by adding a kth warpage variant in a kth unit step to a (k−1)th step warpage; and repeating calculating the kth step warpage until k reaches n.

18. The method of claim 17, wherein the deriving of the expected cumulative warpage further comprises:

comparing the expected cumulative warpage of the interposer with the room temperature warpage reference value;

modifying a design of the interposer so as to change a material in at least one of the plurality of insulating layers responsive to the expected cumulative warpage being less than the room temperature warpage reference value; and deriving the expected cumulative warpage of the interposer of the modified design.

19. The method of claim 9, further comprising:

modifying a design of the interposer so as to change a material in at least one of the plurality of insulating layers responsive to a comparison of the expected cumulative warpage to the room temperature warpage reference value; and fabricating the interposer based on the modified design.

20. A method of manufacturing a semiconductor package comprising an interposer comprising a through electrode passing through a substrate, and a plurality of metal wiring layers and a plurality of insulating layers on the substrate, the method of forming the interposer comprising:

deriving a warpage reference value by using sample interposers;

deriving an expected cumulative warpage of the interposer so that the interposer has the expected cumulative warpage that is greater than or equal to the warpage reference value; and manufacturing the interposer, wherein the deriving of the warpage reference value comprises:

performing a temperature sweep test at a plurality of temperatures by using the sample interposers with different pattern densities of the metal wiring layers, and measuring warpages according to the plurality of temperatures;

deriving a warpage slope, as a function of temperature, of each of the sample interposers;

deriving a warpage model by linearly fitting the warpage slope with respect to an average pattern density of the metal wiring layers in each of the sample interposers; and calculating a room temperature warpage reference value of the interposer based on the warpage model, wherein the deriving of the warpage model comprises linearly fitting the warpage slope with respect to the average pattern density of the metal wiring layers according to an equation: WS=a*PD+b, wherein WS is the warpage slope, PD is the average pattern density, a is a first constant, and b is a second constant.

* * * * *